US011059275B2

(12) United States Patent
Cox

(10) Patent No.: US 11,059,275 B2
(45) Date of Patent: Jul. 13, 2021

(54) APPARATUS AND METHOD FOR MAKING INFORMATION CARRYING CARDS THROUGH RADIATION CURING, AND RESULTING PRODUCTS

(71) Applicant: X-Card Holdings, LLC, West Chester, PA (US)

(72) Inventor: Mark A. Cox, West Chester, PA (US)

(73) Assignee: X-Card Holdings, LLC, West Chester, PA (US)

( * ) Notice: Subject to any disclaimer, the term of this patent is extended or adjusted under 35 U.S.C. 154(b) by 0 days.

(21) Appl. No.: 16/998,381

(22) Filed: Aug. 20, 2020

(65) Prior Publication Data
US 2020/0376823 A1 Dec. 3, 2020

Related U.S. Application Data

(62) Division of application No. 14/913,039, filed as application No. PCT/US2014/050987 on Aug. 14, 2014, now Pat. No. 10,773,503.
(Continued)

(51) Int. Cl.
*B29C 35/08* (2006.01)
*B32B 27/36* (2006.01)
(Continued)

(52) U.S. Cl.
CPC ............ *B32B 27/365* (2013.01); *B29C 35/08* (2013.01); *B29C 35/0805* (2013.01); *B29C 35/0866* (2013.01); *B29C 43/36* (2013.01); *B32B 3/08* (2013.01); *B32B 7/04* (2013.01); *B32B 7/06* (2013.01); *B32B 9/005* (2013.01); *B32B 15/18* (2013.01); *B32B 15/20* (2013.01); *B32B 27/08* (2013.01); *B32B 27/16* (2013.01);
(Continued)

(58) Field of Classification Search
CPC .... B29C 2035/0827; B29C 2035/0822; B29C 2035/0877; B29C 2035/0805; B29C 2035/0866; B29C 65/14
See application file for complete search history.

(56) References Cited

U.S. PATENT DOCUMENTS 3,790,801 A   2/1974 Coleman
3,819,929 A * 6/1974 Newman .................. F21V 29/56
                                                    362/218
(Continued)

FOREIGN PATENT DOCUMENTS

CN    1132375 A1   10/1996
CN    1214780 A     4/1999
(Continued)

*Primary Examiner* — Daniel McNally
(74) *Attorney, Agent, or Firm* — Duane Morris LLP

(57) ABSTRACT

The disclosure provides a method for forming an information carrying card or a core layer of an information carrying card using a radiation curing, and an apparatus configured to provide such a radiation curing. The method includes providing a carrier layer that defines at least one cavity, providing an inlay layer supporting at least one electronic component, and positioning at least a portion of the inlay layer in the at least one cavity. The method further comprises dispensing a radiation crosslinkable polymer composition over the inlay layer, and irradiating the radiation crosslinkable polymer composition.

18 Claims, 17 Drawing Sheets

Related U.S. Application Data

(60) Provisional application No. 61/868,304, filed on Aug. 21, 2013, provisional application No. 61/904,138, filed on Nov. 14, 2013.

(51) Int. Cl.

| | | |
|---|---|---|
| *B32B 37/10* | (2006.01) | |
| *B29C 43/36* | (2006.01) | |
| *B32B 27/28* | (2006.01) | |
| *B32B 37/18* | (2006.01) | |
| *B32B 27/30* | (2006.01) | |
| *B32B 7/04* | (2019.01) | |
| *B32B 27/08* | (2006.01) | |
| *B32B 27/40* | (2006.01) | |
| *B32B 15/18* | (2006.01) | |
| *B32B 15/20* | (2006.01) | |
| *B32B 27/32* | (2006.01) | |
| *B32B 9/00* | (2006.01) | |
| *B32B 3/08* | (2006.01) | |
| *B32B 7/06* | (2019.01) | |
| *B32B 27/38* | (2006.01) | |
| *B32B 27/16* | (2006.01) | |
| *G06K 19/077* | (2006.01) | |
| *B42D 25/45* | (2014.01) | |
| *B42D 25/305* | (2014.01) | |
| *B29L 17/00* | (2006.01) | |
| *B29K 27/12* | (2006.01) | |
| *B32B 38/00* | (2006.01) | |
| *B32B 37/00* | (2006.01) | |

(52) U.S. Cl.
CPC ............ *B32B 27/283* (2013.01); *B32B 27/30* (2013.01); *B32B 27/308* (2013.01); *B32B 27/322* (2013.01); *B32B 27/38* (2013.01); *B32B 27/40* (2013.01); *B32B 37/1018* (2013.01); *B32B 37/185* (2013.01); *B42D 25/305* (2014.10); *B42D 25/45* (2014.10); *G06K 19/07745* (2013.01); *B29C 2035/0822* (2013.01); *B29C 2035/0827* (2013.01); *B29C 2035/0877* (2013.01); *B29K 2027/12* (2013.01); *B29L 2017/00* (2013.01); *B32B 37/003* (2013.01); *B32B 2038/0076* (2013.01); *B32B 2305/34* (2013.01); *B32B 2305/342* (2013.01); *B32B 2305/347* (2013.01); *B32B 2307/412* (2013.01); *B32B 2307/748* (2013.01); *B32B 2425/00* (2013.01); *G06K 19/077* (2013.01); *G06K 19/07722* (2013.01)

(56) References Cited

U.S. PATENT DOCUMENTS

| | | |
|---|---|---|
| 5,013,900 A | 5/1991 | Hoppe |
| 5,169,571 A | 12/1992 | Buckley |
| 5,740,314 A * | 4/1998 | Grimm ............... B29C 35/08 |
| | | 219/405 |
| 5,852,289 A | 12/1998 | Masahiko |
| 6,160,526 A | 12/2000 | Hirai et al. |
| 6,305,609 B1 | 10/2001 | Melzer et al. |
| 7,805,064 B2 | 9/2010 | Ragay et al. |
| 8,314,408 B2 | 11/2012 | Hartsulker et al. |
| 2001/0046652 A1 | 11/2001 | Ostler et al. |
| 2004/0159709 A1 | 8/2004 | Ohta et al. |
| 2007/0252705 A1 | 11/2007 | Halope et al. |
| 2008/0012499 A1* | 1/2008 | Ragay ............... H05B 3/0076 |
| | | 315/113 |
| 2008/0136160 A1 | 6/2008 | Leenders |
| 2012/0206869 A1 | 8/2012 | Droz |
| 2013/0009347 A1 | 1/2013 | Feldman |

FOREIGN PATENT DOCUMENTS

| | | |
|---|---|---|
| CN | 1110014 C | 5/2003 |
| CN | 202862802 U | 4/2013 |
| JP | H7-93817 A | 4/1995 |
| WO | 98/52735 A1 | 11/1998 |
| WO | 2013/151850 A1 | 10/2013 |
| WO | 2014/039184 A1 | 3/2014 |

* cited by examiner

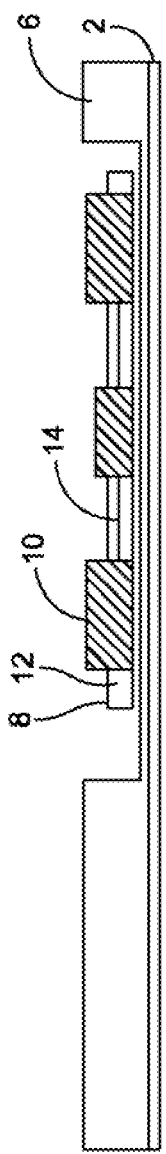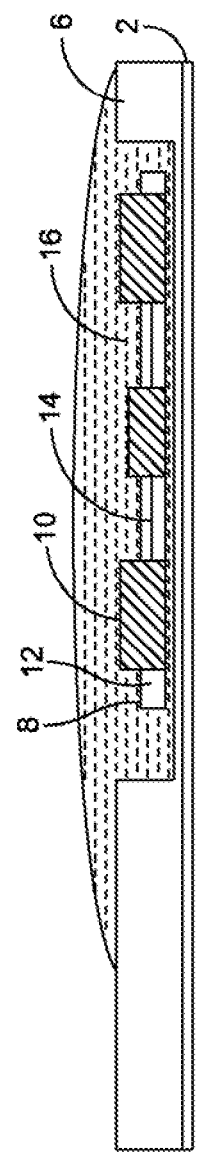

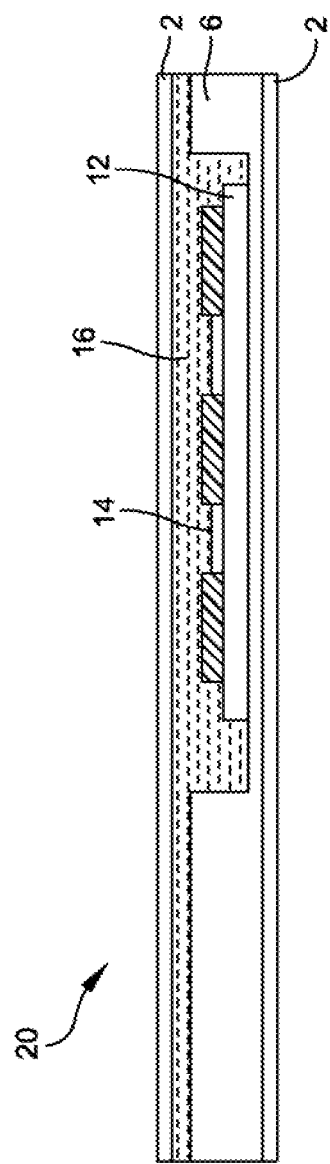

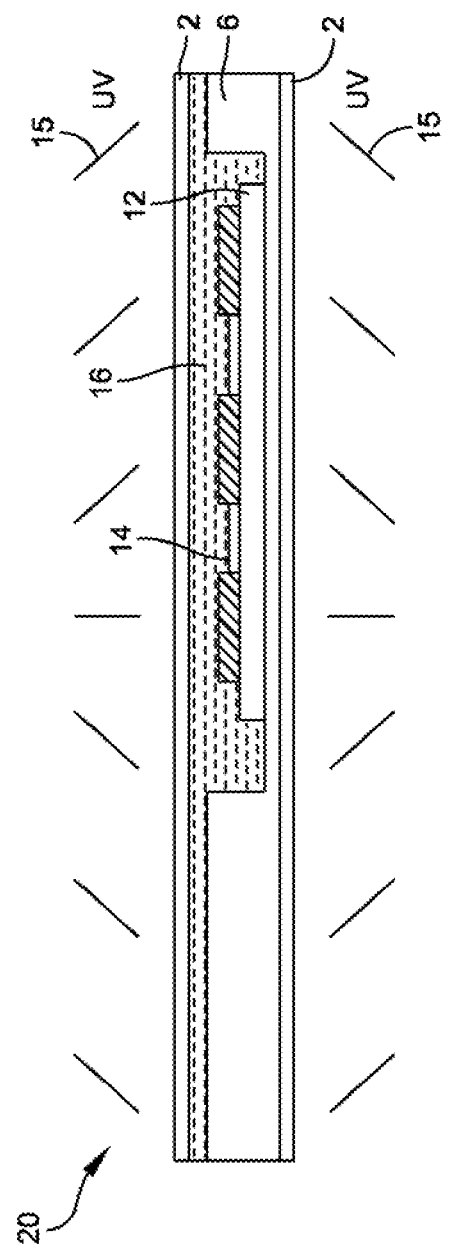

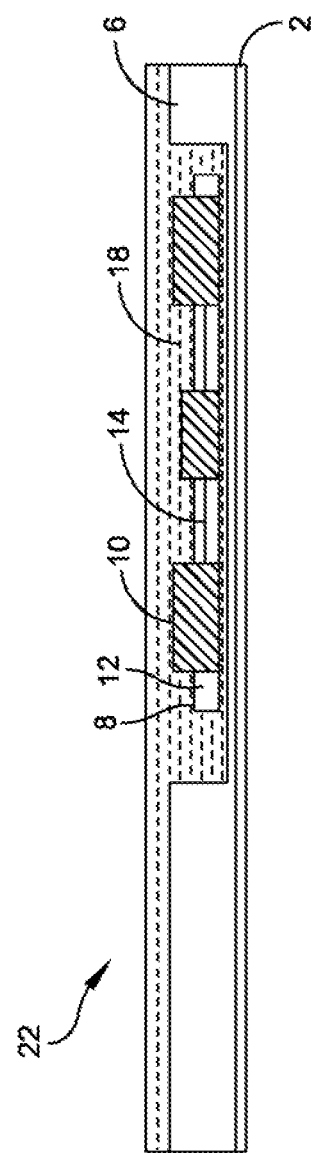

APPARATUS AND METHOD FOR MAKING INFORMATION CARRYING CARDS THROUGH RADIATION CURING, AND RESULTING PRODUCTS

CROSS-REFERENCE TO RELATED APPLICATIONS

This application is a divisional application of U.S. application Ser. No. 14/913,039, filed Feb. 19, 2016, which is a national phase entry under 35 U.S.C. § 371 of International Patent Application No. PCT/US2014/050987, filed Aug. 14, 2014, which claims priority to U.S. Provisional Patent Application No. 61/868,304, filed Aug. 21, 2013, and U.S. Provisional Patent Application No. 61/904,138, filed Nov. 14, 2013, the entireties of which are herein incorporated by reference.

FIELD OF THE INVENTION

The disclosure relates to information carrying cards such as smart cards. More particularly, the disclosed subject matter relates to an apparatus and a method for making an information carrying card or its core layer using radiation curing, and the resulting information carrying cards.

BACKGROUND OF THE INVENTION

Information carrying cards provide identification, authentication, data storage and application processing. Such cards or parts include key cards, identification cards, telephone cards, credit cards, bankcards, tags, bar code strips, other smart cards and the like. Counterfeiting and information fraud associated with traditional plastic cards causes tens of billions of dollars in the losses each year. As a response, information carrying cards are getting "smarter" to enhance security. Smart card technologies provide solutions to prevent fraud and decrease resulting losses.

Information carrying cards often include an integrated circuit (IC) embedded in a thermoplastic material, such as polyvinyl chloride (PVC). Information has been input and stored in the integrated circuit before a transaction. In use, information carrying cards work in either a "contact" or "contactless" mode. In contact mode, an electronic component on the card is caused to directly contact a card reader or other information receiving device to establish an electromagnetic coupling. In contactless mode, the electromagnetic coupling between the card and the card reading device is established through electromagnetic action at a distance, without the need for physical contact. The process of inputting information into the IC of the information carrying card also works in either of these two modes.

When information carrying cards become "smarter," the amount of information stored in each card often increases, and the complexity of the embedded IC's also increases. The cards also need to withstand flexing to protect sensitive electronic components from damage as well as offer good durability during use. A relatively easy and full-scale commercial process having improved productivity at low cost is also desired.

SUMMARY OF THE INVENTION

The invention provides an apparatus and a method for making a core layer for an information carrying card or an information carrying card, using radiation curing. The disclosure also provides the resulting core layer for an information carrying card, and the information carrying card.

In some embodiments, a method for forming an information carrying card or a core layer of an information carrying card is provided. The method comprises the following steps: providing a carrier layer that defines at least one cavity, providing an inlay layer supporting at least one electronic component, and positioning at least a portion of the inlay layer in the at least one cavity. The method further comprises dispensing a radiation crosslinkable polymer composition over the inlay layer, and irradiating the radiation crosslinkable polymer composition to form a crosslinked polymer composition.

In some embodiments, the carrier layer is a first thermoplastic layer comprising at least one thermoplastic material. The radiation crosslinkable polymer composition, which may be a liquid or a paste, comprises a curable precursor selected from the group consisting of acrylate, methacrylate, urethane acrylate, silicone acrylate, epoxy acrylate, methacrylate, silicone, urethane and epoxy.

In some embodiments, the method comprises a step of applying vacuum to the radiation crosslinkable polymer composition. The method may further comprise disposing a second thermoplastic layer above the carrier layer after the step of applying the radiation crosslinkable polymer composition over the inlay layer. In some embodiments, the method comprises a step of providing a release film above the carrier layer after applying the radiation crosslinkable polymer composition over the inlay layer.

In the step of irradiating (i.e. curing) the radiation crosslinkable polymer composition, the carrier layer, the inlay and the radiation crosslinkable composition are pressed under a pressure. Such a curing is performed through radiation emitted toward at least one side of the carrier layer, for example, two sides of the carrier layer. The pressure may be in the range of from 0.01 MPa to 3 MPa in some embodiments.

The radiation comprises at least one of visible light, ultraviolet (UV), infrared (IR), electronic beam (EB), and combinations thereof. In some embodiments, the curing step is performed at room temperature. In some embodiments, additional heat, for example, moderate heat may be used in the step of curing the radiation crosslinkable polymer composition.

In some embodiments, the crosslinked polymer composition provides a printable surface. The method can comprise a step of directly printing words or images onto a surface of the crosslinked polymer composition. A portion of the crosslinked polymer composition may be disposed over a top surface of the carrier layer, for example, covering the top surface of the carrier layer.

The disclosure also provides a method for fabricating an information carrying card, comprising forming a core layer as described. The method for fabricating an information carrying card further comprises laminating at least one thermoplastic film on each side of the core layer of the information carrying card, or bonding at least one thermoplastic film on each side of the core layer of the information carrying card. The methods provided in this disclosure are useful in making a heat-sensitive information carrying card. The inlayer layer comprises at least one electronic component being heat sensitive.

The present disclosure also provides an apparatus used for carrying out the methods described. The apparatus comprises at least one support layer having both a plurality of ribs and a plurality of channels between two adjacent ribs, a plurality of radiation sources and a radiation transparent layer. Each of the plurality of radiation sources is disposed in one respective channel and configured to provide radiation. A radiation transparent layer is coupled with the at least one support layer and configured to protect the plurality of radiation sources. The radiation comprises at least one of visible light, ultraviolet (UV), infrared (IR), electronic beam (EB) and combinations thereof. In some embodiments, each of the plurality of radiation sources comprises light emitting diode (LED) configured to emit UV light. The plurality of radiation sources may be connected with a power source.

In the apparatus, the at least one support layer may be made of a metal such as aluminum, aluminum alloy, stainless steel, or any other suitable metals or a combination thereof. The radiation transparent layer may comprise glass, UV transparent ceramic, or transparent polymers such as poly(methyl methacrylate) and polycarbonate. The at least one support layer may be coupled with the radiation transparent layer with a pliable layer therebetween. The pliable layer may comprise a fluoropolymer, for example, polytetrafluoroethylene (PTFE).

The disclosure also provides a system used for carrying out the methods described. The system comprises a bottom portion of an apparatus and a top portion of the apparatus. Each of the bottom portion and the top portion comprises at least one support layer having both a plurality of ribs and a plurality of channels between two adjacent ribs, a plurality of radiation sources and a radiation transparent layer. Each of the plurality of radiation sources is disposed in one respective channel and configured to provide radiation. A radiation transparent layer is coupled with the at least one support layer and configured to protect the plurality of radiation sources. In some embodiments, the radiation transparent layer in the bottom portion and the radiation transparent layer in the top portion face to each other, and are configured to cure a layered structure having a radiation crosslinkable polymer composition disposed therebetween. The radiation may comprise at least one of visible light, UV, IR, EB, and combinations thereof. For example, each of the plurality of radiation sources may comprise LED configured to emit UV light.

The system may comprise a power source connected to the plurality of radiation sources. The power source may supply a direct current (DC) directly to the plurality of radiation sources, or may comprise a transformer converting an alternating current (AC) to a direct current. The at least one support layer may be made of a metal such as aluminum, aluminum alloy, stainless steel, or any other suitable metal or a combination thereof. The radiation transparent layer may comprise glass, UV transparent ceramic or transparent polymers such as poly(methyl methacrylate) and polycarbonate. The at least one support layer may be coupled with the radiation transparent layer with a pliable layer, for example, a fluoropolymer layer therebetween.

In some embodiments, the system further comprises a spacer disposed between the radiation transparent layer in the bottom portion and the radiation transparent layer in the top portion. The spacer has a thickness to accommodate a layered structure. The layered structure may be an information carrying card or a core layer of an information carrying card being fabricated. The spacer is configured to provide a predetermined final thickness of the information carrying card or the core layer.

In some embodiments, the system also comprises a pressure unit configured to press the layered structure under a pressure while irradiating the radiation crosslinkable polymer composition. The pressure may be in the range of from 0.01 MPa to 3 MPa.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. In some instances, the dimensions of the various features are arbitrarily expanded or reduced for clarity. Like numerals denote like features throughout the specification and the figures.

FIGS. 1-6 illustrate cross sectional views of layered structures at different steps in an exemplary process of forming a core layer of an information carrying card, in accordance with some embodiments.

FIG. 1 illustrates a sectional view of a first thermoplastic layer having at least one cavity optionally disposed over a release film.

FIG. 2 is a cross sectional view of the structure after an inlay layer is disposed partially or fully inside the cavity of the first thermoplastic layer of FIG. 1.

FIG. 3 is a cross sectional view of the structure of FIG. 2 after a crosslinkable polymer composition is dispensed over the inlay layer inside the cavity.

FIG. 4 is a cross sectional view of the resulting structure after a release film is placed over the structure of FIG. 3.

FIG. 5 illustrates the structure of FIG. 4 subject to UV radiation from both sides in accordance with some embodiments.

FIG. 6 is a cross sectional view of an exemplary core layer of an information carry card, which is fabricated according to the structure in FIGS. 1-6 and steps in FIG. 7.

DETAILED DESCRIPTION OF PREFERRED EMBODIMENTS

Figure 7:
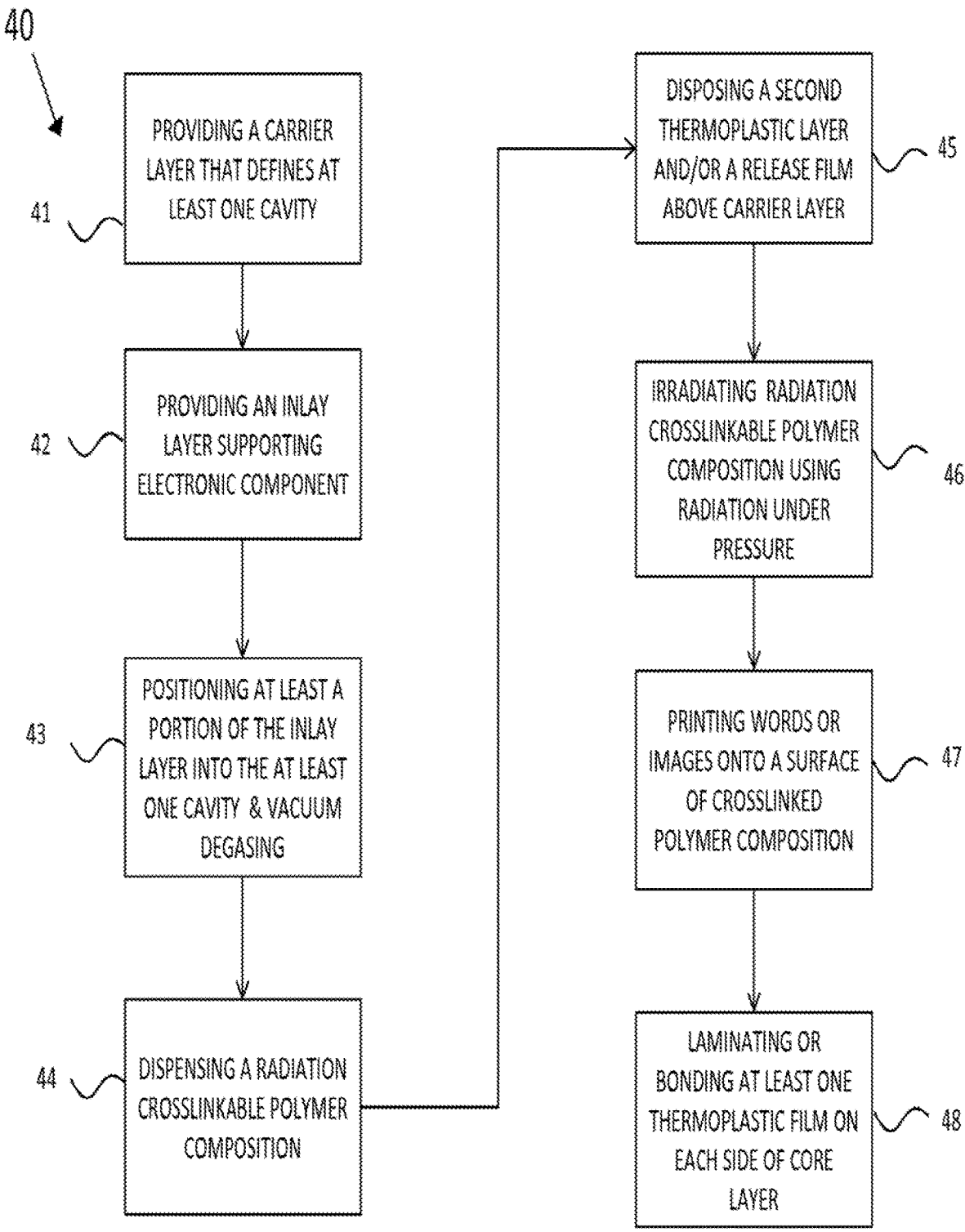
FIG. 7 is a flow chart diagram illustrating an exemplary process of forming a core layer of an information carrying card or an information carrying card comprising a step of radiation curing, in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that any apparatus to be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For brevity, unless expressly stated otherwise, references to "information carrying card" or "smart card" made throughout this description are intended to encompass at least key cards, identification cards, telephone cards, credit cards, bankcard, power cards, tags, bar code strips, any part comprising an integrated circuit (IC), and the like. "Information carrying card" or "smart card" also includes a wide variety of shapes, which include but are not limited to rectangular sheets, circular sheets, strips, rods and rings. "Information carrying card" or "smart card" also includes any information carrying parts of both "contact" and "contactless" modes. "Information carrying card" or "smart card" also encompasses any information carrying cards with or without an on-board power supply. An information carrying card comprising a power supply is also referred as a "power card."

In FIGS. 1-6 and 9-18, like items are indicated by like reference numerals, and for brevity, descriptions of the structure, provided above with reference to the previous figures, are not repeated. The methods described in FIG. 7 are described with reference to the exemplary structure described in FIGS. 1-6 and the apparatus and system described in FIGS. 9-19.

1. Method for Making Information Carrying Card:

Some embodiments provide a method for forming an information carrying card or a core layer of an information carrying card. The method may comprise the following steps including: providing a carrier layer that defining at least one cavity, providing an inlay layer supporting at least one electronic component, and positioning at least a portion of the inlay layer in the at least one cavity. The method further comprises dispensing a radiation crosslinkable polymer composition over the inlay layer, and irradiating (i.e. curing) the radiation crosslinkable polymer composition using radiation such as visible lights, UV, IR, EB or a combination thereof, to form a crosslinked polymer composition.

The carrier layer may be a first thermoplastic layer comprising at least one thermoplastic material. The radiation crosslinkable polymer composition comprises a curable precursor selected from the group consisting of acrylate, methacrylate, urethane acrylate, silicone acrylate, epoxy acrylate, methacrylate, silicone, urethane, epoxy or the like. The radiation crosslinkable polymer composition may be a liquid or a paste, and can be degased after dispensed over the inlay layer.

In some embodiments, a second thermoplastic layer, or a release film, or both can be disposed above the carrier layer after the radiation crosslinkable polymer composition is disposed over the inlay layer. In the curing step, the carrier layer, the inlay layer and the radiation crosslinkable composition may be pressed under a pressure. The radiation may be at least one of visible light, UV, IR, EB, and combinations thereof.

In some embodiments, the crosslinked polymer composition provides a printable surface. The method can comprise a step of directly printing words or images onto a surface of the crosslinked polymer composition. A portion of the crosslinked polymer composition may be disposed over a top surface of the carrier layer, for example, covering the top surface of the carrier layer.

The method can be used to make an information carrying card or its core layer, which may be heat sensitive. The inlay layer comprises at least one heat sensitive electronic component. The method can also be used to make an information carrying card having high density of electronic components. One example is a biometric information carrying card. Another example is an information carrying card having an inlay layer having at least one electronic component configured to display a one time passcode (OTP). The inlay layer comprises at least one LCD component in some embodiments. The inlay layer can also comprise EInk display components, electrochromic components, electrophoretic components or organic light emitting diodes (OLED), or any other suitable electronic components, or a combination thereof.

The at least one electronic component can be partially or fully disposed inside the cavity over the carrier layer, depending on the relative sizes of the inlay layer and the cavity. The inlay layer may also comprise at least one sheet of metal, ceramic, metal containing material, ceramic containing material, plastics or the like.

A general method for making a core layer for an information carrying card and the resulting information carrying card in the present disclosure are disclosed in U.S. patent application Ser. No. 13/801,630 filed Mar. 13, 2013, and U.S. patent application Ser. No. 13/801,677; filed Mar. 13, 2013, which are hereby incorporated by reference in entirety.

At step 41 of FIG. 7, a carrier layer 6 (e.g., a first thermoplastic layer) is provided. The carrier layer 6 has at least one cavity.

Referring to FIG. 1, a carrier layer 6 that defines at least one cavity 7 (or an opening) is disposed over a release film 2. The release film 2 is optional in some embodiments. In some embodiments, no release film 2 is used. Examples of release film 2 included but are not limited to a sheet of polytetrafluoroethylene under the trade name Teflon®, any other fluoropolymers, silicones, fluoropolymer or silicone coated films. In some embodiment, release film 2 can include two release films, for example, a second release film is disposed over a first release film. The two release films can be formed from the same material. In some embodiments, at least one breathable release film is used. Examples of a breathable release film is a silicone coated paper (e.g., a silicone coated, unbleached parchment baking paper, available from Regency Wraps company under the trade name of "If you care"). Another example of release film 2 is a parchment paper (27-81T or 35-81T) available from Paterson Papers Company, Paterson, N.J.

Carrier layer 6 can be molded or laminated from one or more layers of thermoplastic films. Examples of materials that are suitable for use in forming carrier layer 6 include polyvinyl chloride (PVC), a copolymer of vinyl chloride, polyolefin, polycarbonate, polyester, polyamide, acrylonitrile butadiene styrene copolymer (ABS), and the like. Carrier layer 6 may be a PVC, or a copolymer of vinyl chloride and another monomer such as vinyl ether, vinyl ester or vinyl acetate, or a compound or blend of PVC and a vinyl chloride polymer. Examples of PVC films suitable for use with the invention are available from suppliers such as Klockner Pentaplast of America, Inc. of Gordonsville, Va.; and Shijiazhuang Eurochem Co. Ltd of China. Examples of such copolymer resins are available from Dow Chemical Company under trade name of UCAR®, and from BASF of Ludwigshafen, Germany under trade name of Laroflex®. UCAR® is a copolymer of vinyl chloride and vinyl acetate. The grades include YYNS-3, VYHH and VYHD. Laroflex® is a copolymer of vinyl chloride and vinyl isobutyl ether. The grades include MP25, MP 35, MP45 and MP60. All of these polymer resins may be supplied as fine powder. A powder of these copolymers can be added to modify PVC resins for films. Carrier layer 6 having at least one cavity 7 can be formed by die-cutting one or more thermoplastic film and then laminating and heating one or more thermoplastic films. For example, one thermoplastic film, which can be in the range of 0.025 mm to 0.5 mm in thickness, is cut with a hole and placed above another thermoplastic film, which can be in the range of 0.025 mm to 0.25 mm in thickness. The two films are then laminated to form a first thermoplastic layer 6 having at least one cavity 7.

At step 42 of FIG. 7, an inlayer layer 8 supporting at least one electronic component 10 is provided. At step 43, at least a portion of inlayer layer 8 is disposed into the at least one cavity 7 of carrier layer 6.

Referring to FIG. 2, at least one portion of inlay layer 8 is disposed inside at least one cavity 7 of carrier layer 6. Inlay layer 8 is partially or fully disposed inside cavity 7. Inlay layer 8 can be fixed onto the surface of carrier layer 6 through heat bonding, adhesive bonding, or any other suitable method. In some embodiments, inlay layer 8 or a surface of carrier layer 6 may be tacky without need of fixing inlay layer 8 onto the surface of carrier layer 6. Inlay layer 8 comprises at least one active or passive electronic component 10 embedded or surface mounted on a supporting film 12. Inlay layer 8 may comprise a printed circuit board (PCB). Electronic components 10 may be embedded or surface mounted on the PCB supporting material.

Examples of supporting film 12 include but are not limited to polyimide, polyester such as PET, glass filled epoxy sheet such as FR-4. A printed circuit board (PCB) having all the components are abbreviated as PCBa. For brevity, the references to PCB in this disclosure will be understood to encompass any PCBs including PCBa. Examples of electronic components 10 inside inlay layer 8 include but are not limited to active or passive electronic components, e.g., an integrated circuit (IC), a battery for a "power card," an antenna, and a functional component such as light emitting diodes (LED). In some embodiments, electronic components 10 are configured to display a one time passcode (OTP). Electronic components 10 are interconnected via wires or traces 14. Supporting film 12 may be a polymer based dielectric material. In some embodiments, inlay layer 8 may comprises components such as a battery fixed onto a small piece of a polymer film such as a PVC film, and then inlay layer 8 comprising the components and the polymer film may be disposed into the cavity in the first thermoplastic layer 6.

Inlay layer 8 may have any dimension relative to the size of a cavity in the first thermoplastic layer 6. Inlay layer 8 may be partially or fully disposed in such a cavity. In some embodiments, the size of the cavity on first thermoplastic layer 6 is larger than the size of inlay layer 8. Inlay layer 8 may be fully disposed in the cavity. In some embodiments, the size of the cavity in first thermoplastic layer 6 is substantially the same as or slightly larger than the size of inlay layer 6 of PCB. The shape of the cavity often matches with the shape of inlay layer 8. In some embodiments, the size of the at least one cavity on first thermoplastic layer 6 is less than the size of inlay layer 8. The size of the at least one cavity is substantially the same as or slightly larger than a portion of inlay layer 8 of the PCB. For example, the shape and size of one cavity may match with one electronic component 10. Examples of electronic components 10 include but are not limited to a battery, an antenna, or an active or passive electronic component, e.g., an integrated circuit (IC) in inlay layer 8. In some embodiments, inlay layer 8 may comprise a piece or a sheet of metal, ceramic, metal containing material, ceramic containing material, plastic or the like. Examples of suitable materials for this piece or sheet include but are not limited to platinum, copper, tungsten, metallized power containing materials, alumina, silica, and ceramic powder containing materials. This piece or sheet may be in a certain color or weight, having certain visual or other sensational characteristics.

In some embodiments, inlay layer 8 comprises electronic components 10, which are configured to provide an information carrying card, which may be heat sensitive, pressure sensitive, or both. A heat sensitive component may withstand a maximum temperature below 150° C., for example, in the range of 70-120° C. Examples of heat-sensitive electronic components 10 include but are not limited to LCD components, EInk display components, electrochromic components, electrophoretic components, organic light emitting diodes (OLED), or any other suitable electronic components, or a combination thereof. Examples of heat sensitive information carrying card include but are not limited to LCD, electrophoretic display, electronic ink display, electrochromic display, biometric information cards. One example is a biometric information carrying card. Another example is an information carrying card having an inlay layer having at least one electronic component configured to display a one time passcode (OTP).

Figure 8:
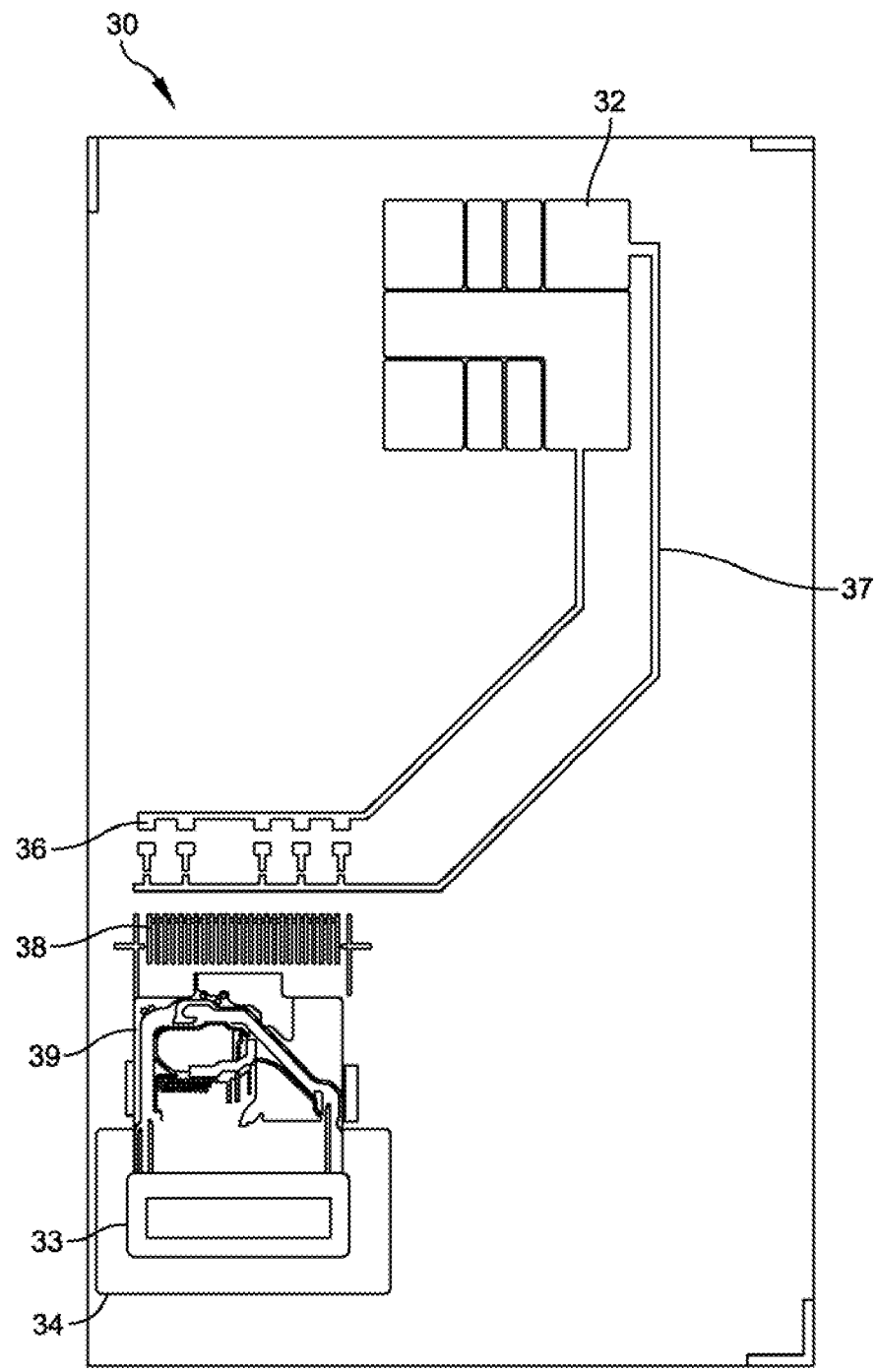
FIG. 8 illustrates an exemplary inlay layer for an information carrying card in some embodiments.

FIG. 8 illustrates an exemplary inlay layer 30 for a biometric information carrying card. Inlay layer 30 comprises printed circuit board (PCB). Inlay layer 30 may comprise a contact pad 32, a biometric sensor or sensor pad 33, a sealing bezel 34 for biometric sensor 33, pad traces 36 for electronic components, connecting traces 37, connectors 38 connecting biometric sensor to PCB, and connector traces 39 for biometric sensor 33. In some embodiments, some portions such as contact pad 32 and biometric sensor 33 may be cut open and exposed. The biometric information carrying card may be a smart card with contact mode. Connecting traces 37 may be used to contact a power supplied by a biometric reader for card activation.

At step 44 of FIG. 7, a radiation crosslinkable polymer composition 16 is dispensed over inlay layer 8.

Referring to FIG. 3, a radiation crosslinkable polymer composition 16, is dispensed over carrier layer 6, and inlay layer 8 inside cavity 7. The radiation crosslinkable polymer composition 16 may be also dispensed over carrier layer 6 outside cavity 7 some embodiments. Composition 16 may comprise a curable precursor, in a liquid or paste form. Such a curable precursor may be acrylate, methacrylate, urethane acrylate, silicone acrylate, epoxy acrylate, urethane, epoxy, silicone or the like.

The curable precursor in the radiation crosslinkable polymer composition 16 may comprise a monomer, an oligomer or pre-polymer having functional groups. The precursor is cross-linkable under a regular curing conditions including but not limited to radiation such as ultraviolet (UV) light, and radiation together with heat. The curable precursor may be in liquid or paste form. Its viscosity may be in the range of 1-100,000 cps. In some embodiments, the curable precursor is urethane acrylate. These curable precursors are readily available from specialty chemical suppliers. Examples of these suppliers include but are not limited to Dymax Corporation of Torrington, Conn. and Sartomer USA, LLC of Exton, Pa.

The radiation crosslinkable polymer composition 16 may be unfilled in some embodiments, and comprises filler or other additives in some other embodiments. The crosslinkable polymer composition may comprise in the range of about 0.5 wt. % to about 80 wt. % of the filler. The filler can be inorganic or organic filler. For example, the filler can be a particulate thermoplastic filler such as polyolefin, polyvinyl chloride (PVC), a copolymer of vinyl chloride and at least another monomer, or a polyester such as polyethylene terephthalate (PET). The at least another monomer in the vinyl chloride co-polymer filler may be vinyl ester, vinyl acetate or vinyl ether in some embodiments. The particulate thermoplastic filler may be a compound or a blend comprising a thermoplastic resin, for example, a compound or a blend comprising PVC or a modified PVC. Examples of such a copolymer are available from Dow Chemical Company under trade name of UCAR™, and from BASF of Ludwigshafen, Germany under trade name of Laroflex™. UCAR™ is a copolymer of vinyl chloride and vinyl acetate. The grades include YYNS-3, VYHH and VYHD. Laroflex™ is a copolymer of vinyl chloride and vinyl isobutyl ether. The grades include MP25, MP 35, MP45 and MP60. All of these polymer resins are often supplied in the form of fine powder. Particulate thermoplastic filler might be obtained through suspension or emulsion polymerization of one or more corresponding monomers or, through pulverization of solid plastics. The particulate form can be of any size, by way of example and not limitation. The particles may be in the range of 0.5-200 microns. In some embodiments, the particles are in the range of 1-1000 nm.

Radiation cross-linkable polymer composition 16 may further comprise at least one curative based on general principles of polymer chemistry. Such a radiation cross-linkable polymer composition 16 becomes a solid cross-linked composition 18 after curing. Preferably, such a cross-linked composition 18 is more flexible than carrier layer 6 in some embodiments. For example, the cross-linkable composition 16 comprises a first curative for radiation curing and optionally a second curative for radiation curing. During the curing or cross-linking reaction, such a cross-linkable composition transforms into a solid cross-linked polymer composition. Such a cross-linked polymer composition 18 is also known in the art as a "thermosetting" polymer or "thermoset" to distinguish it from a thermoplastic polymer.

Examples of a suitable crosslinkable polymer composition 16 include but are not limited to a formulation comprising a curable precursor such as acrylate or urethane acrylate. Examples of such a formulation include but are not limited to X-685-31-1 and X-685-31-2, available from Dymax Corporation of Torrington, Conn. X-685-31-1 is a formulation comprising isobornyl acrylate, 2-hydroxyethyl methacrylate, 2-hydroxy-3-phenoxypropyl acrylate, t-butyl perbenzoate and a photoinitiator. Its viscosity is 1047 cP. X-685-31-2 is also a formulation comprising isobornyl acrylate, 2-hydroxyethyl methacrylate, 2-hydroxy-3-phenoxypropyl acrylate, t-butyl perbenzoate and a photoinitiator. Its viscosity is 1025 cP. These examples are only intended to illustrate embodiments in accordance with the invention, and as such should not be construed as imposing limitations upon the claims.

A radiation cross-linkable polymer composition 16 may be packed in a syringe and dispensed using the standard dispensing apparatus or equipment for adhesives, encapsulants, sealants and potting compounds. The amount of cross-linkable composition 16 to be dispensed can be calculated and controlled based on the volume of the cavity and inlay layer 8.

At step 45 of FIG. 7, a release film 2 (or 2') or a second thermoplastic layer can be placed above carrier layer 6. Referring to FIG. 4, a release film 2 as described is placed over the structure of FIG. 3. The release film 2 may be any kind of release films, and may be the same as the release film 2 under carrier 6. Examples of the release film over the structure of FIG. 3 include but are not limited to a breathable silicone coated paper, a sheet of a fluoropolymer such as PTFE. Release film 2 may be transparent, translucent, or opaque but transparent or translucent to UV or other radiation. In some embodiments, release film 2 may include two release films. In some embodiments, release film 2 is a parchment paper (27-81T or 35-81T) available from Paterson Papers Company, Paterson, N.J. It is surprisingly found that a translucent film such as parchment paper (27-81T or 35-81T) can disperse radiations such as UV to result in uniform curing of the cross-linkable composition 16. In some embodiments, no release film 2 is used.

Instead of release film 2, a second thermoplastic layer (not shown) is placed above carrier layer 6. In some embodiments, a second thermoplastic layer and release film 2 may be placed above carrier layer 6. The second thermoplastic layer comprises a thermoplastic material selected from polyvinyl chloride, copolymer of vinyl chloride, polyolefin, polycarbonate, polyester, polyamide, and ABS copolymer. The second thermoplastic layer might be the same as the first thermoplastic layer (carrier layer) 6. Its thickness may be in the range of 0.025 mm to 0.25 mm. This thermoplastic layer becomes a part of the core layer if used. The second thermoplastic layer may be transparent, translucent, or opaque but transparent or translucent to UV or other radiation.

The radiation crosslinkable polymer composition 16 may be degased in a vacuum chamber after being dispensed over carrier layer 6, or after step 45. A vacuum may be applied onto the crosslinkable polymer composition 16 in a vacuum chamber. The pressure range is in the range of 10 Pa to 1000 Pa. The vacuum can be maintained for 0.5 to 10 minutes, preferably 1-3 minutes. The vacuum is released in the end of a cycle. One or multiple cycles can be used to achieve a bubble free sample. Such a vacuum process is performed at low temperature, preferably at room temperature.

At step 46 of FIG. 7, the radiation cross-linkable polymer composition 16 is cured using radiation such as UV, IR, visible light, e-beam (EB), or a combination thereof.

Figure 17:
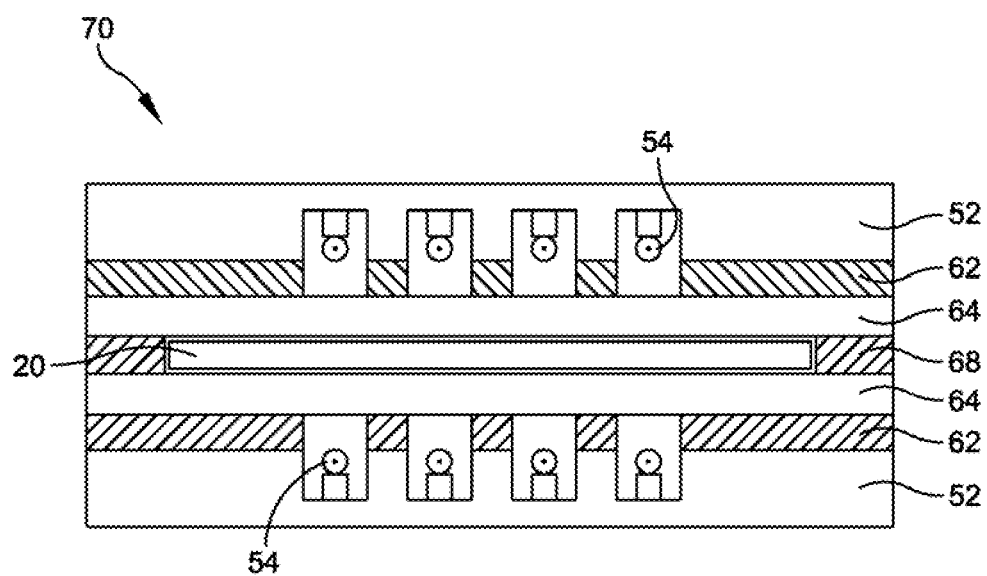
FIG. 17 illustrates an exemplary apparatus used in a method for making a core layer of an information carrying card or the information carrying card in accordance with some embodiments. The exemplary apparatus comprises the bottom portion of FIG. 13 and the top portion of FIG. 15.
Figure 18:
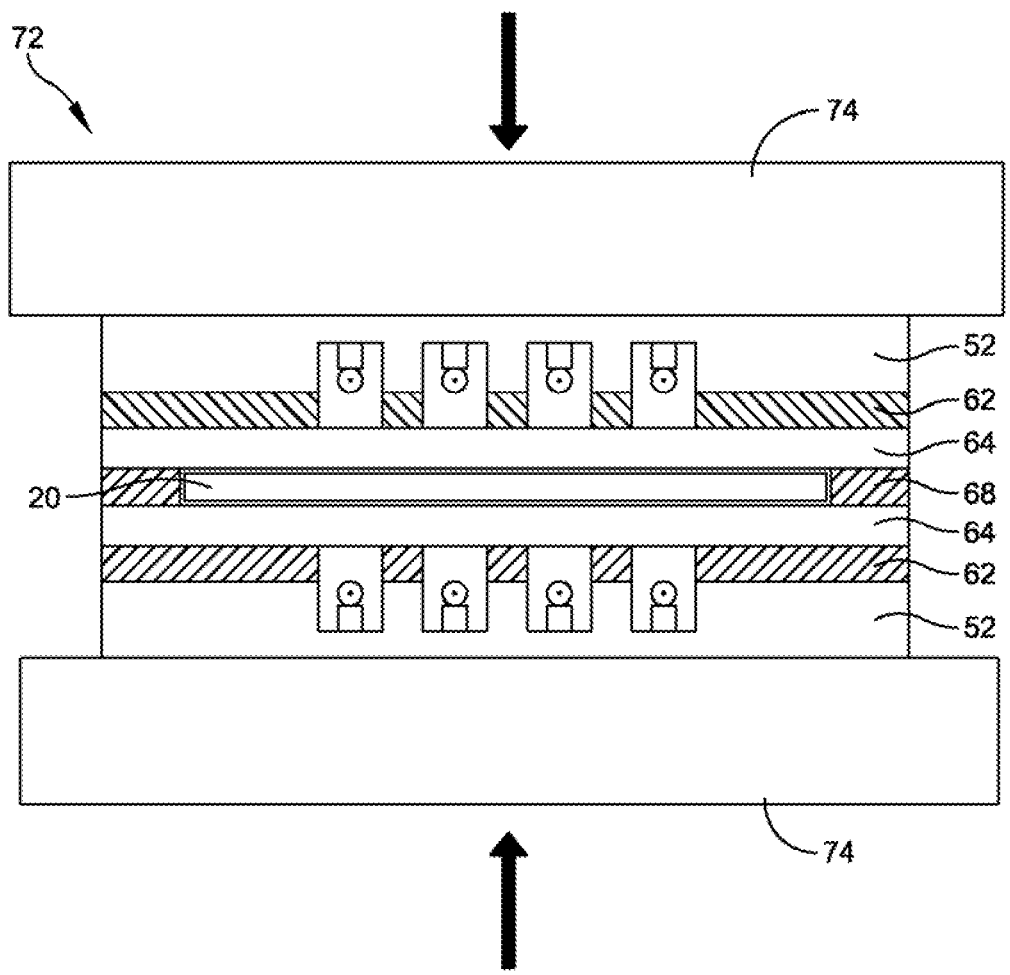
FIG. 18 illustrates the exemplary apparatus of FIG. 17 under compression.

Referring to FIGS. 4 and 5, the sandwiched structure of FIG. 4 is placed under pressure, and irradiated with radiation in an apparatus as described in FIGS. 17 and 18. As illustrated in FIG. 18, a spacer 68 can be used to control the final thickness of the crosslinkable polymer composition 16 over carrier layer 6, and thus the overall thickness of the core layer of an information carrying card or an information carrying card. Such a curing is performed through one type of radiation emitted toward at least one side of the carrier layer (i.e. one side or two sides of the carrier layer). The pressure may be in the range of from 0.01 MPa to 3 MPa.

The one type of radiation may be at least one of visible light, UV, IR, EB, and combinations thereof. For example, UV may be used. In some embodiments, UV having a wavelength in the range of 350-400 nm is used. The curing time may be in the range from 10 seconds to 60 seconds. In some embodiments, the curing may be performed at room temperature or at a temperature of 35-40° C. In some other embodiments, additional heat, for example, moderate heat at a temperature below 80° C., for example, in the range of from 50° C. to 80° C., may be used in the curing step.

Referring to FIG. 6, a core layer for an information carrying card is formed, after release film 2 (if used) is peeled off. The crosslinkable polymer composition 16 becomes into the crosslinked polymer composition 18 in solid state. Different reference numerals are used for the purpose of differentiation only even though they may share the same chemical composition. Referring to FIG. 6, an exemplary core layer 22 of an information carry card comprises a first thermoplastic layer (carrier layer) 6, an inlay layer 8, and a cross-linked polymer composition 18. Inlay layer 8 comprises electronic components 10, for example, at least one printed circuit board (PCB), supporting film 12 and interconnects 14. The electronic components 10, such as a battery and an active or passive electronic components 10, are connected with interconnects 14. Electronic components 10 are embedded on supporting film 12. The cross-linked polymer composition 18 fills the voids and remaining spaces inside the cavity on carrier layer 6 and inlay layer 8. In some embodiments, the cross-linked polymer composition 18 directly contacts the outer surface of electronic components 10. Inlay layer 8 may have any dimension relative to the size of a cavity in carrier layer 6. Inlay layer 8 may be partially or fully disposed into such a cavity.

In some embodiments, a core layer of an information carry card can include a full open cavity for an inlay. The size of a cavity on the first thermoplastic layer 6 is larger than the size of inlay layer 8. In some embodiments, such a cavity is close to but slightly smaller than the size of an information carrying card. Inlay layer 8 is fully disposed into the cavity. The shape of the cavity may not be the same as the shape of inlay layer 8. In some embodiments, an open inlay cavity is close to the size of an inlay layer 8. The size of a cavity on the first thermoplastic layer 6 is substantially the same as or slightly larger than the size of inlay layer 8. The shape of the cavity matches with the shape of inlay layer 8. In this configuration, inlay layer 8 can be fully disposed inside the cavity on carrier layer 6. In some embodiments, an exemplary core layer of an information carry card includes a window cavity partially for an inlay. The size of the at least one cavity on carrier layer 6 is less than the size of inlay layer 8. The size of the at least one cavity is substantially the same as or slightly larger than a portion of inlay layer 8. A portion of inlay layer can be cut open for form one or more holes so that an electronic component 10 can be fit into one of the holes. Electronic component 10 in inlay layer 8 can be also inserted from one side of carrier layer 6. During the fabrication process, a crosslinkable composition 16 for the crosslinked polymer composition 18 can be applied to from the other side of the first thermoplastic layer 6.

A portion of the crosslinked polymer composition 18 may be disposed over a top surface of carrier layer 6, for example, covering the top surface of carrier layer 6. The thickness of the portion of the cross-linked polymer composition 18 above the top surface of carrier layer 6 can be in any thickness, for example, in the range of 1 micron to 100 micron in thickness.

The crosslinked polymer composition 18 may provide a printable surface. At step 47, words or images can be directly printed onto a surface of the crosslinked polymer composition 18.

Some embodiments provide a method for fabricating an information carrying card, comprising forming a core layer as described. The method for fabricating an information carrying card further comprises laminating, or bonding at least one thermoplastic film on each side of the core layer of the information carrying card, as shown in step 48 of FIG. 7. Hot lamination or adhesive bonding may be used. In a process of adhesive bonding, any suitable adhesive may be used.

Examples of the at least one thermoplastic film includes but are not limited to a printable thermoplastic film, a transparent film and combinations thereof. Such a film may be made of PVC, PET or any other suitable polymer films. In some embodiments, a printable film is an imaging receiving layer, and may not be transparent and may contain white pigments. In some other embodiments, words or images can be directly printed onto the crosslinked polymer composition 18 and an additional printable film may not be used. Before the printing process, surface treatment may not be needed in some embodiments. Surface treatment may also be used to improve adhesion between two layers in other embodiments. Examples of surface treatment methods include but are not limited to plasma treatment or corona treatment.

In some embodiments, a technique called "reversed printing technique" may be used. One side of a transparent film may be printed with a thin layer of white pigments which may comprise printed words or images. The printed surface is bonded or laminated with the core layer as described above. The other side of the transparent film can be a shiny surface as the top surface of an information carrying card.

The described methods are useful in making a heat-sensitive information carrying card. The inlayer layer comprises at least one electronic component being heat sensitive. The information carrying card may have different sizes. In some embodiments, the information carrying card may have a size following ISO/IEC 7810 standard. For example, an ID-1 type smart card, which is for most of the banking card and ID cards, has a size of 85.6×53.98 mm.

The examples above are described using one information carrying card for demonstration only. In a production process of making a core layer or an information carrying card, a sheet of core layer can comprise a plurality of units for a plurality of information carrying card. During or after the fabrication, the sheet can be cut into a plurality of core layers or a plurality of information carrying cards.

2. Apparatus and System for Making Information Carrying Card or its Core Layer

Referring to FIGS. 17 and 18, some embodiments provide an apparatus or a system used for carrying out the methods described. FIGS. 9-18 illustrate the method of making such an apparatus or system.

Figure 9:
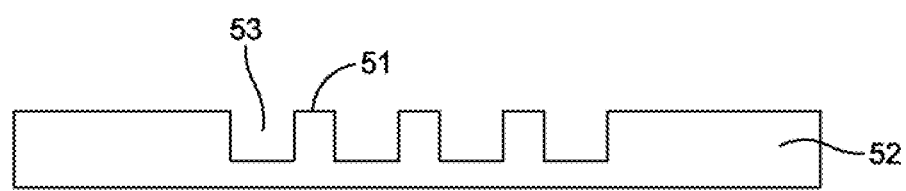
FIG. 9 is a cross sectional view of an exemplary frame having ribs and channels for an apparatus configured to provide radiation in some embodiments.
Figure 10:
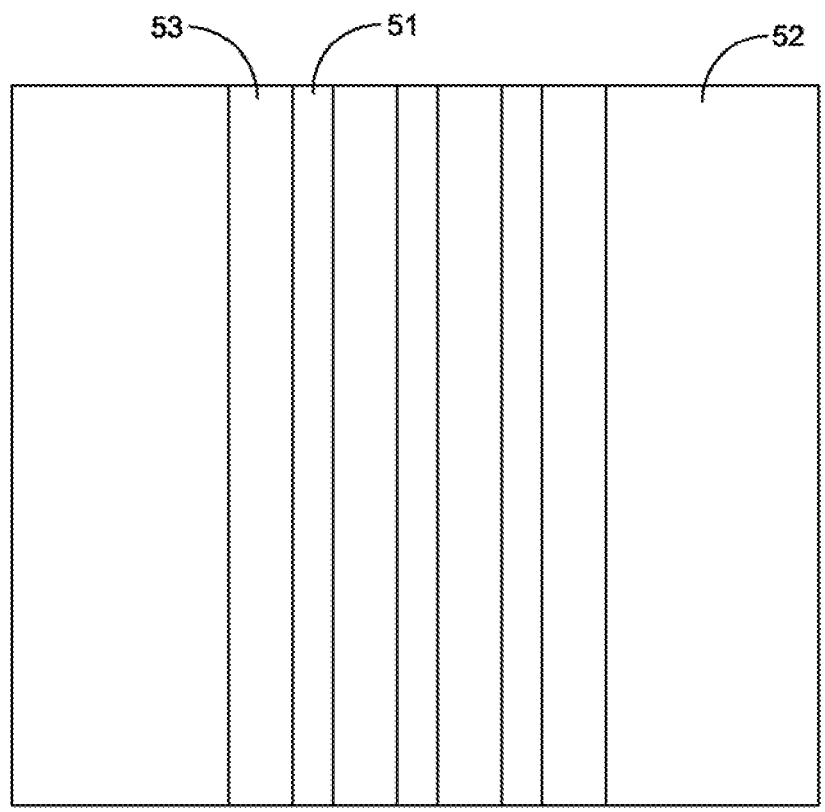
FIG. 10 is a top down view of the frame of FIG. 9.

Referring to FIGS. 9 and 10, at least one support layer 52 having both a plurality of ribs 51 and a plurality of channels 53 between two adjacent ribs is provided. Support layer 52 may be made of a metal such as aluminum, aluminum alloy, stainless steel, or any other suitable metal or a combination thereof. Ribs 51 are elongated ridges. Channels 53 are shallow trenches machined away from one side of support layer 52, as shown in FIG. 9. As shown in FIG. 10, ribs 51 and channels 53 may be parallel to each other.

Figure 11:
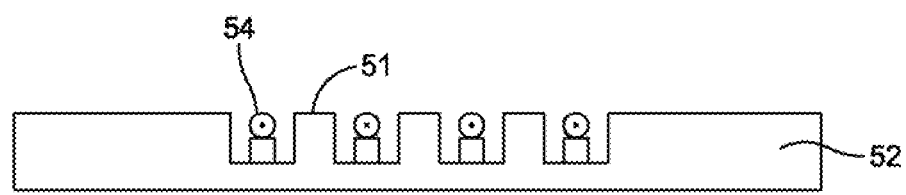
FIG. 11 is a cross sectional view of the fame of FIG. 9 having a plurality of radiation sources disposed in the channels.
Figure 12:
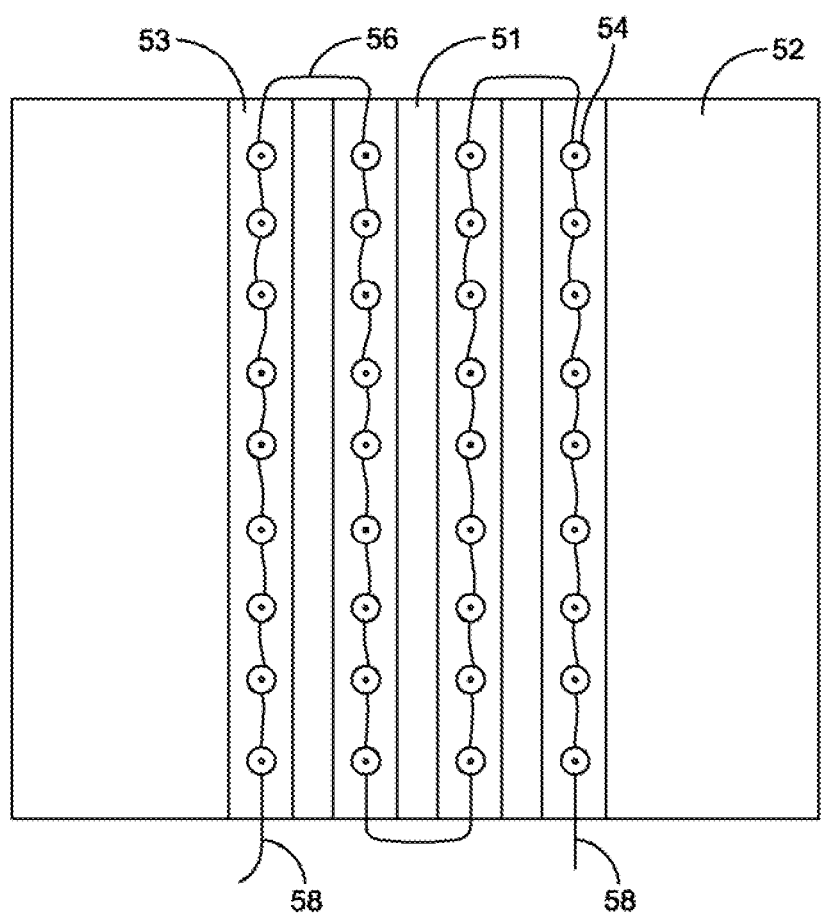
FIG. 12 is a top down view of the frame of FIG. 11.

Referring to FIGS. 11 and 12, a plurality of radiation sources 54 are disposed in one respective channel 53 and configured to provide radiation such as UV, IR, visible light, EB, any other radiation or combinations thereof. The plurality of radiation sources 54 may be connected in parallel or in series through wires 56, and then connected with a power source (not shown) through wires 58. The power source may supply a direct current (DC) directly to the plurality of radiation sources, or may comprise a transformer converting an alternating current (AC) to a direct current. Any suitable alternative arrangements may be used to connect and power radiation sources 54. In some embodiments, each of the plurality of radiation sources 54 comprises LED configured to emit UV light. The UV light may have a specific wavelength or wavelength range (e.g., 450-400 nm). The wavelength may be tailored to match with the curing chemistry of the radiation crosslinkable polymer composition 16. During a curing process using UV, radiation sources 54 may not give off heat. Radiation sources 54 may be configured to provide IR, which optionally provide moderate heat.

Figure 13:
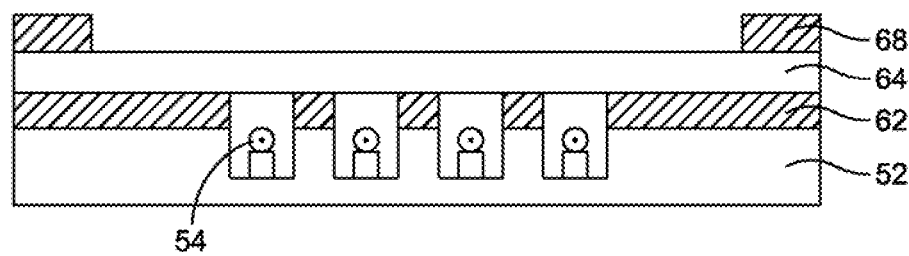
FIG. 13 is a cross sectional view of a bottom portion of the apparatus configured to provide radiation in accordance with some embodiments.
Figure 14:
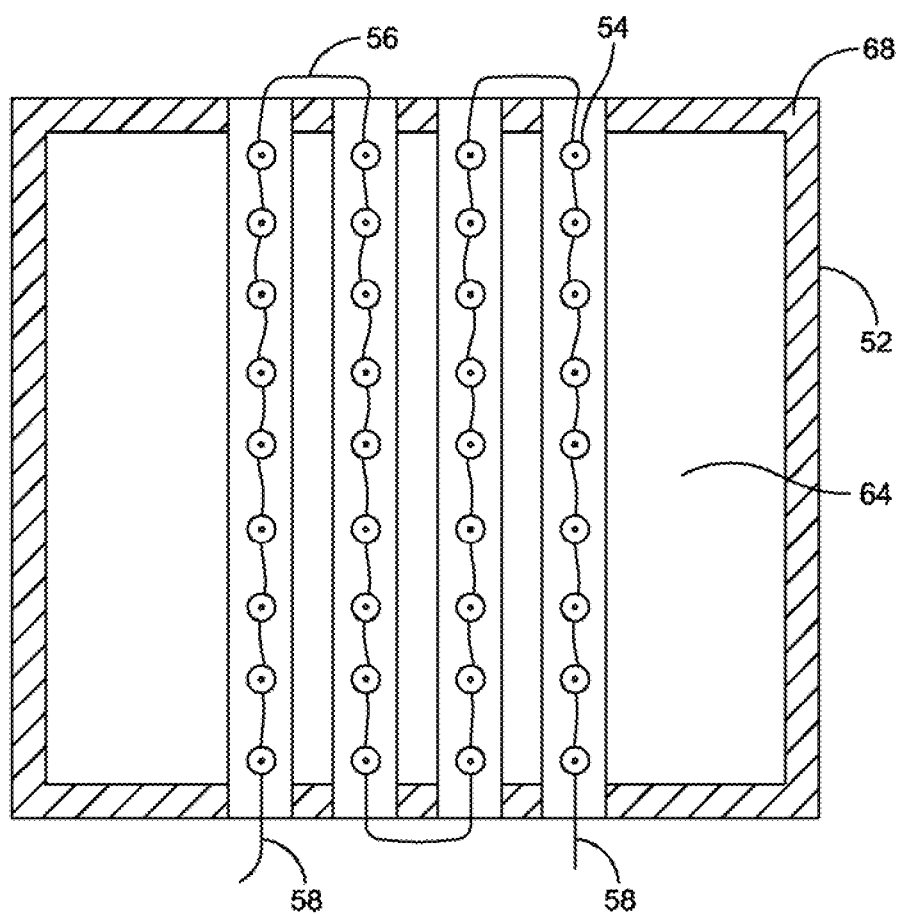
FIG. 14 is a top down view of the bottom portion of the apparatus shown in FIG. 13.

Referring to FIGS. 13 and 14, a radiation transparent layer 64 and a spacer 68 are provided. The radiation transparent layer 64 may comprise glass, plastics or UV transparent ceramic such as aluminium oxynitride under tradename ALON® available from Surmet Corportion, Burlington, Mass. Transparent polymers such as poly(methyl methacrylate) and polycarbonate can be also used. Poly(methyl methacrylate) is well known under the tradename PLEXIGLASS. Polycarbonate is available under the tradename LEXAN® from SABIC. A radiation transparent layer 64 may have a smooth finished surface. A radiation transparent layer 64 is coupled with the at least one support layer 52 and configured to protect the plurality of radiation sources 54. The at least one support layer 52 may be coupled with the radiation transparent layer 64 with a pliable layer 62 therebetween. The pliable layer 62 may comprise a fluoropolymer, for example, polytetrafluoroethylene.

The structure illustrated in FIG. 13 can be a bottom portion of an apparatus. Spacer 68 may be disposed over radiation transparent layer 64. Spacer 68 may be a removable tape or film bonded on the periphery of radiation transparent layer 64, and has a thickness to accommodate a layered structure such as a core layer or an information carrying card to be fabricated as described in FIG. 18.

Figure 15:
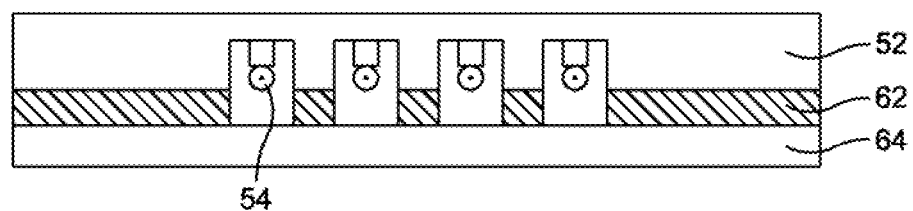
FIG. 15 is a cross sectional view of a top portion of the apparatus configured to provide radiation in accordance with some embodiments.
Figure 16:
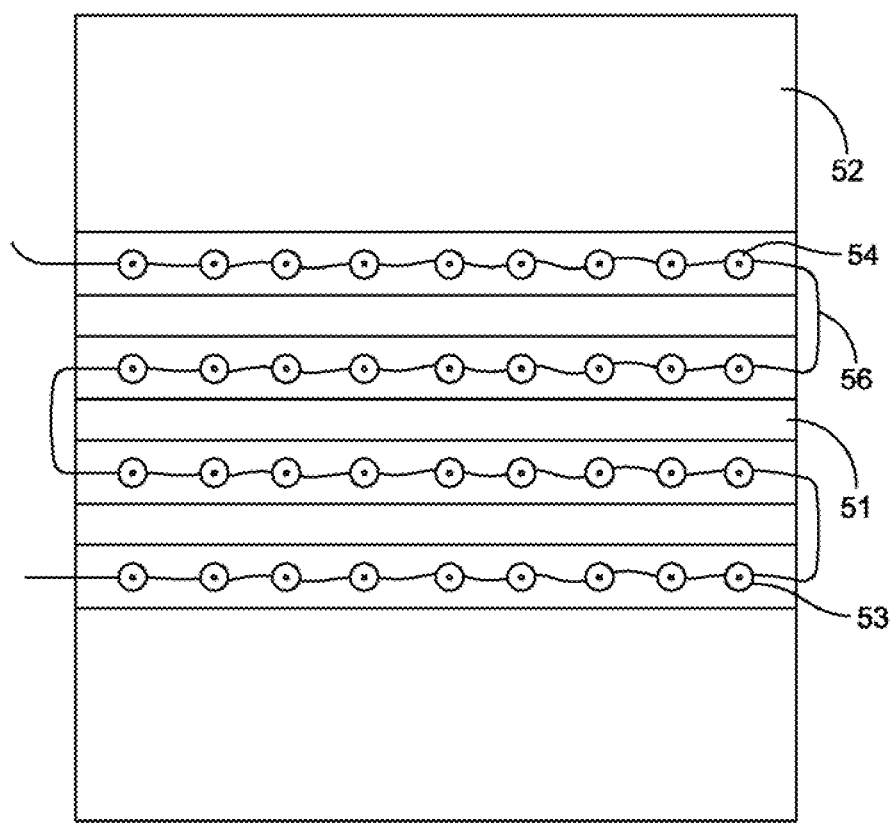
FIG. 16 is a top down view of a top (or upper) portion of the apparatus having a certain orientation of the channels for the radiation sources in some embodiments.

Referring to FIG. 15, similar to the bottom portion in FIGS. 13 and 14, a top portion of an apparatus can be provided for a system of the present disclosure. The bottom portion also comprises at least one support layer 52 having both a plurality of ribs 51 and a plurality of channels 53 between two adjacent ribs, a plurality of radiation sources 54 and a radiation transparent layer 64. Each of the plurality of radiation sources 54 is disposed in one respective channel 53 and configured to provide radiation. A radiation transparent layer 64 is coupled with the at least one support layer 52 and configured to protect the plurality of radiation sources 54 and provide a smooth surface. The radiation may comprise at least one of visible light, UV, IR, EB, and combinations thereof. For example, each of the plurality of radiation sources 54 may comprise light emitting diode (LED) configured to emit ultraviolet (UV) light. As shown in FIG. 16, ribs 51 and channels 53 may be parallel to each other, and may be in an orientation the same as or different from that in the bottom portion of FIG. 14.

Referring to FIG. 17, the bottom portion of FIGS. 13 and 14 and the top portion of FIGS. 16 and 17 can be assembled to form an apparatus 70 in a system 72. The radiation transparent layers 64 in each portion may face to each other and are configured to cure a layered structure 20 having a radiation crosslinkable polymer composition 16 disposed therebetween.

Referring to FIG. 18, system 72 may comprise a pressure unit having two pressing plates 74 configured to press the layered structure 20 under a pressure while curing the radiation crosslinkable polymer composition 16 using a type of radiation. The pressure may be in the range of from 0.01 MPa to 3 MPa. In some embodiments, the top or bottom portion of apparatus 70 is fixed onto a respective pressing plate 74. System 72 may comprise a power source connected to the plurality of radiation sources 54. As described, system 72 may comprise a spacer 68 disposed between the radiation transparent layer 64 in the bottom portion and the radiation transparent layer 64 in the top portion face. Spacer 68 may be a film, a sheet or a tape bonded onto a radiation transparent layer 64 either in the top portion or the bottom portion of apparatus 70. Spacer 68 has a thickness to accommodate a layered structure 20. Layered structure 20 is an information carrying card or a core layer of an information carrying card being fabricated as described. Spacer 68 is configured to provide a predetermined final thickness of the information carrying card or a core layer of an information carrying card. In system 72, radiation transparent layer 64 having a smooth surface can provide a smooth surface of a resulting core layer or an information carrying card.

In a fabrication process, system 72 including apparatus 70 is assembled with a layered structure 20. Steps 41-46 of method 40 in FIG. 7 can be performed accordingly. Layered structure 20 can be pressed under a pressure and irradiated for a period of time (e.g., in the range of from 10 seconds to 60 seconds). The radiation sources 54 can be turned off and the pressure can be released. After the layered structure 20 is removed, another cycle of the process can be performed. In some embodiments, the fabrication process is in a batch process. In some embodiments, the fabrication process can be a continuous automated production.

A critical requirement in the manufacture of a core layer for an information carrying card is to achieve a very smooth coplanar surface on the top and bottom so that the overlay sheets are applied and laminated there is little to no visible deformation of the card graphics and of final products. Thermal expansion and shrinkage occur to the conventional encapsulating materials used in other processes, resulting in warping of a core layer, and rough or deformed coplanar surface.

The methods described in the present disclosure provided a minimal shrinkage and yield a very smooth and coplanar surface, with well-tailored and controlled thickness. The methods also offer advantages including but are not limited to an increase in production rate, a low temperature and low pressure (LTLP) process especially for heat sensitive components, and flexibility in product design and fabrication.

Although the subject matter has been described in terms of exemplary embodiments, it is not limited thereto. Rather, the appended claims should be construed broadly, to include other variants and embodiments, which may be made by those skilled in the art.

What is claimed is:

1. An apparatus comprising a top portion and a bottom portion, each of the bottom portion and the top portion comprising:
    at least one support layer having both a plurality of ribs and a plurality of channels between two adjacent ribs;
    a plurality of radiation sources, wherein each of the plurality of radiation sources is disposed in one respective channel and is configured to provide radiation; and a radiation transparent layer coupled with the at least one support layer and configured to protect the plurality of radiation sources,
wherein each of the plurality of radiation sources comprises light emitting diode (LED) configured to emit ultraviolet (UV) light.

2. The apparatus of claim 1, wherein the at least one support layer is coupled with the radiation transparent layer with a pliable layer therebetween.

3. The apparatus of claim 2, wherein the pliable layer comprises a fluoropolymer.

4. The apparatus of claim 1, wherein the radiation comprises at least one of visible light, ultraviolet (UV), infrared (IR) and electronic beam (EB).

5. The apparatus of claim 1, wherein the plurality of radiation sources are connected with a power source.

6. The apparatus of claim 1, wherein the at least one support layer is made of aluminum, aluminum alloy, stainless steel, or any other suitable metal or a combination thereof.

7. The apparatus of claim 1, wherein the radiation transparent layer comprises glass, UV transparent ceramic, poly (methyl methacrylate), or polycarbonate.

8. The apparatus of claim 1, wherein the plurality of radiation sources are connected in series with wires disposed in the plurality of channels.

9. A system comprising
a bottom portion of an apparatus; and
a top portion of the apparatus, wherein each of the bottom portion and the top portion comprises
at least one support layer having both a plurality of ribs and a plurality of channels between two adjacent ribs;
a plurality of radiation sources, wherein each of the plurality of radiation sources is disposed in one respective channel and is configured to provide radiation; and
a radiation transparent layer coupled with the at least one support layer and configured to protect the plurality of radiation sources, and
the radiation transparent layer in the bottom portion and the radiation transparent layer in the top portion face to each other and are configured to cure a layered structure having a radiation crosslinkable polymer composition disposed therebetween,
wherein each of the plurality of radiation sources comprises light emitting diode (LED) configured to emit ultraviolet (UV) light.

10. The system of claim 9 further comprising a power source connected to the plurality of radiation sources.

11. The system of claim 10, wherein the power source supplies a direct current (DC) directly to the plurality of radiation sources, or comprises a transformer converting an alternating current (AC) to a direct current.

12. The system of claim 9 further comprising a pressure unit configured to press the layered structure under a pressure while curing the radiation crosslinkable polymer composition using a type of radiation.

13. The system of claim 12, wherein the pressure unit is configured to apply the pressure in a range of from 0.01 MPa to 3 MPa.

14. The system of claim 9, wherein the radiation comprises at least one of visible light, ultraviolet (UV), infrared (IR) and electronic beam (EB).

15. The system of claim 9, wherein the at least one support layer is made of aluminum, aluminum alloy, stainless steel, or any other suitable metal or a combination thereof.

16. The system of claim 9, wherein the radiation transparent layer comprises glass, UV transparent ceramic, poly (methyl methacrylate), or polycarbonate.

17. The system of claim 9, wherein the at least one support layer is coupled with the radiation transparent layer with a pliable layer therebetween.

18. The system of claim 9 further comprising a spacer disposed between the radiation transparent layer in the bottom portion and the radiation transparent layer in the top portion face, and the spacer has a thickness to accommodate a layered structure.

* * * * *